(12) United States Patent
Song et al.

(10) Patent No.: US 10,473,964 B2
(45) Date of Patent: Nov. 12, 2019

(54) TOUCH DISPLAY PANEL AND METHOD FOR MANUFACTURING THE SAME

(71) Applicant: Infovision Optoelectronics (Kunshan) Co., Ltd., KunShan, JiangSu Province (CN)

(72) Inventors: Binbin Song, KunShan (CN); Fengching Chiu, Taoyuan (TW); Liwei Kung, KunShan (CN)

(73) Assignee: INFOVISION OPTOELECTRONICS (KUNSHAN) CO., LTD., Kunshan, Jiangsu Province (CN)

( * ) Notice: Subject to any disclaimer, the term of this patent is extended or adjusted under 35 U.S.C. 154(b) by 62 days.

(21) Appl. No.: 15/663,750

(22) Filed: Jul. 29, 2017

(65) Prior Publication Data

US 2018/0113345 A1    Apr. 26, 2018

(30) Foreign Application Priority Data

Oct. 21, 2016 (CN) .......................... 2016 1 0919791

(51) Int. Cl.
  *G02F 1/1333* (2006.01)
  *G02F 1/1335* (2006.01)
  (Continued)

(52) U.S. Cl.
  CPC ........ *G02F 1/13338* (2013.01); *G02F 1/1368* (2013.01); *G02F 1/13439* (2013.01);
  (Continued)

(58) Field of Classification Search
  CPC .......... G02F 1/13338; G02F 1/133514; G02F 1/134363; G02F 1/13439; G02F 1/133528;
  (Continued)

(56) References Cited

U.S. PATENT DOCUMENTS

2014/0049704 A1\* 2/2014 Yao ..................... G02F 1/13338
349/12
2015/0362949 A1\* 12/2015 Chen .................. G02F 1/13338
345/173
(Continued)

FOREIGN PATENT DOCUMENTS

CN          101814256 A     8/2010
CN          103294294 A     9/2013

*Primary Examiner* — Shan Liu
(74) *Attorney, Agent, or Firm* — Cheng-Ju Chiang

(57) ABSTRACT

A touch display panel includes a TFT substrate, a CF substrate disposed above the TFT substrate, a liquid crystal layer sandwiched between the TFT substrate and the CF substrate, and a touch sensor formed on the CF substrate. The touch sensor includes a plurality of first electrodes, a plurality of second electrodes, a plurality of third electrodes, a plurality of bridges and an insulating layer. Each of the second electrodes is continuous, each of the first electrodes is interrupted by the second electrodes to form a plurality of electrode sections, and two adjacent electrode sections of the first electrode are electrically connected via a bridge. A plurality of blank areas are defined and surrounded by the first electrodes and the second electrodes, and the third electrodes are respectively disposed within the blank areas. The first electrodes, the second electrodes and the third electrodes are electrically insulated from each other.

9 Claims, 7 Drawing Sheets

(51) Int. Cl.
*G02F 1/1343* (2006.01)
*G02F 1/1368* (2006.01)
*G06F 3/041* (2006.01)
*G06F 3/044* (2006.01)

(52) U.S. Cl.
CPC .. *G02F 1/133514* (2013.01); *G02F 1/133516* (2013.01); *G02F 1/133528* (2013.01); *G02F 1/134363* (2013.01); *G06F 3/044* (2013.01); *G06F 3/0412* (2013.01); *G06F 2203/04103* (2013.01); *G06F 2203/04111* (2013.01); *G06F 2203/04112* (2013.01)

(58) Field of Classification Search
CPC ............. G02F 1/1368; G02F 1/133516; G02F 2001/13312; G06F 3/0412; G06F 3/044; G06F 2203/04112; G06F 2203/04103; G06F 2203/04111; G06F 3/0421; G06F 3/045; G06F 3/041; G06F 3/0414; G06F 3/0416; G06F 3/0488; G06F 2203/04107; G06F 2203/041; G06F 3/03547; G06F 3/0418; G06F 3/046; G06F 3/047; G06K 11/06; H05K 9/0079; H05K 9/0073; H05K 9/0081; H05K 9/0088
USPC ............................................. 349/12; 245/173
See application file for complete search history.

(56) References Cited

U.S. PATENT DOCUMENTS

| | | | |
|---|---|---|---|
| 2016/0109977 A1* | 4/2016 | Hashimoto | G06F 3/044 345/174 |
| 2016/0179259 A1* | 6/2016 | Watanabe | G06F 3/044 345/174 |
| 2016/0204532 A1* | 7/2016 | Ishida | H05K 1/117 439/61 |
| 2016/0266691 A1* | 9/2016 | Jang | G06F 3/044 |
| 2016/0313827 A1* | 10/2016 | Song | G06F 3/044 |
| 2018/0011385 A1* | 1/2018 | Kang | H01L 51/5237 |
| 2018/0039360 A1* | 2/2018 | Akimoto | G06F 3/0412 |
| 2018/0143477 A1* | 5/2018 | Chai | G02F 1/13338 |
| 2018/0239457 A1* | 8/2018 | He | G06F 3/044 |

* cited by examiner

TOUCH DISPLAY PANEL AND METHOD FOR MANUFACTURING THE SAME

CROSS REFERENCE TO RELATED APPLICATION

The present application is based on and claims priority of Chinese patent application No. 201610919791.7, filed on Oct. 21, 2016. The entire disclosure of the above-identified application, including the specification, drawings and claims are incorporated herein by reference in its entirety.

TECHNICAL FIELD

The present application relates to touch display technology, and more particularly to a touch display panel and a method for manufacturing the same.

BACKGROUND

With the development of information technology, touch panels have gradually replaced conventional mouses and keyboards and are widely used in various electric products, due to its humanization design and convenience in operation for input. Among the touch panels, capacitive touch panel has been widely applied due to its fast response speed, high touch sensitivity, good reliability and high endurance. The capacitive touch panel mainly includes a cover lens and a touch sensor, whose working principle is described as below. A voltage is applied to four corners of the touch panel to form a fixed electric field. When a finger touches the screen, a capacitance between the human body and a transparent electrode of the touch sensor is changed, and an electric current is accordingly generated under the electric field. The touched position can be calculated out by a controller according to the different distances from the position where the electric current is generated to the four corners of the touch panel.

Based on different arrangements of the touch sensor in a display panel, the touch display panel includes the following types: add-on type, one glass solution (OGS), In-Cell type, and On-Cell type. In an add-on type touch display panel, the touch sensor and the display panel are separated formed and then assembled together to cause the product to be relatively thicker, failing to meet the ultra-thin requirement of some handheld portable electronic devices. In an OGS touch display panel, the touch sensor and the cover lens are integrated together and then adhered to the display panel by an optically clear adhesive, having the advantage of high touch sensitivity and the disadvantage of poor strength and being fragile. In an In-Cell type touch display panel, the touch sensor is formed on an inner surface of a color filter (CF) substrate of the display panel, having a low production yield due to its complicated structure and manufacturing process. In an On-Cell touch display panel, the touch sensor is formed on an outer surface of the color filter substrate of the display panel, the touch sensor being embedded between the color filter substrate and the top polarizer.

FIG. 1 is a cross-sectional view of a conventional touch display panel, FIG. 2 is a schematic view of an electric field distribution of the touch sensor in FIG. 1, and FIG. 3 is a planar schematic view of the touch sensor in the conventional touch display panel. Referring to FIGS. 1 to 3, a conventional touch display panel 20 includes, from the bottom to the top, a thin-film transistor (TFT) substrate 21, a liquid crystal (LC) layer 22, a color filter (CF) substrate 23, a touch sensor 24, a top polarizer (POL) 25 and a cover lens 26, wherein an emission electrode (Tx) 241 and a receiving electrode (Rx) 242 of the touch sensor 24 are arranged at different layers, therefore a vertical electric field is formed between the emission electrode 241 and the receiving electrode 242 (FIG. 2). The emission electrode 241 and the receiving electrode 242 are spaced from each other and in the form of metal mesh, an extension direction of the emission electrode 241 is orthogonal to an extension direction of the receiving electrode 242.

The metal mesh of the electrodes 241, 242 have small resistance and high light transmission. However, since the emission electrode 241 and the receiving electrode 242 are arranged at different layers, when light transmits through the emission electrode 241 and the receiving electrode 242, an interference phenomenon will occur separately in each of the different layers. Thus, a serious Moire fringe will be introduced, and the display effect of the display panel is impacted. Meanwhile, on the touch sensor 24, there is an exposed area 243 which is not covered by either the emission electrode 241 or the receiving electrode 242. The exposed area 243 causes the pattern of the touch sensor 24 to be uneven, resulting in difference in light transmission and affecting the display quality of the touch display panel.

SUMMARY

In view of above-mentioned problems, the present application provides a touch display panel and a method for manufacturing the touch display panel.

In an embodiment, the present application provides a touch display panel. The touch display panel includes a TFT substrate, a CF substrate disposed above the TFT substrate, a liquid crystal layer sandwiched between the TFT substrate and the CF substrate, a touch sensor formed on the CF substrate, and a polarizer disposed on the touch sensor. The touch sensor includes a plurality of first electrodes, a plurality of second electrodes, a plurality of third electrodes, a plurality of bridges and an insulating layer. The first electrodes, the second electrodes and the third electrodes are located at the same layer. The first electrodes are intersected with the second electrodes. Each of the second electrodes is continuous without being uninterrupted, each of the first electrodes is interrupted by the second electrodes to form a plurality of electrode sections, and two adjacent electrode sections of the first electrode are electrically connected via a bridge. A plurality of blank areas are defined and surrounded by the first electrodes and the second electrodes, and the third electrodes are respectively disposed within the blank areas. The first electrodes, the second electrodes and the third electrodes are electrically insulated from each other, and the insulating layer is arranged between the second electrodes and the bridges to insulate the bridges from the second electrodes.

In an embodiment, the present application provides a method for manufacturing the touch display panel. The method includes the following steps:

assembling the TFT substrate, the liquid crystal layer and the CF substrate together, wherein the liquid crystal layer is sandwiched between the TFT substrate and the CF substrate;

forming the first electrodes, the second electrodes and the third electrodes on an outer surface of the CF substrate by a photolithography process, wherein the first electrodes, the second electrodes and the third electrodes are located at the same layer and are electrically insulated from each other;

forming the insulating layer on the second electrodes;

forming the bridges on the insulating layer, wherein two adjacent electrode sections of the first electrode are electrically connected with each other by a bridge, and the first electrodes, the second electrodes, the third electrodes, the bridges and the insulating layer together form the touch sensor; and assembling the polarizer on the touch sensor.

In an embodiment, the present application provides a touch display panel. The touch display panel includes a TFT substrate, a CF substrate disposed above the TFT substrate, a liquid crystal layer sandwiched between the TFT substrate and the CF substrate, a polarizer disposed above the CF substrate, and a touch sensor provided between the CF substrate and the polarizer. The touch sensor includes a plurality of first electrodes, a plurality of second electrodes, a plurality of bridges and an insulating layer. The first electrodes and the second electrodes are located at the same layer. The first electrodes are intersected with the second electrodes. Each of the second electrodes is continuous without being uninterrupted, each of the first electrodes is interrupted by the second electrodes to form a plurality of electrode sections, and two adjacent electrode sections of the first electrode are electrically connected via a bridge. Each of the first electrodes is in the form of a mesh structure which is formed by a plurality of conductive wires intersecting with each other to form a plurality of grids. A plurality of nodes are formed at the intersection points of the conductive wires. The bridge electrically connects the nodes of one electrode section with the nodes of an adjacent electrode section. The node is in an annular shape with a central portion of the node being hollow to define a central hole. Two ends of the bridge are inserted into and fixed in the central holes of the nodes. The insulating layer is arranged between the second electrodes and the bridges to insulate the bridges from the second electrodes.

In the touch display panel, the first electrodes and the second electrodes of the touch sensor are formed at the same layer. As light passes through the touch sensor, the light interface phenomenon is weakened, to improve the display effect of the touch display panel. Further, the blank areas in the touch sensor are filled with the third electrodes, such that the pattern of the touch sensor becomes uniform throughout the touch display panel, and the light transmission through the touch sensor is uniform to bring a uniform appearance to the user. Moreover, the electrode sections of each first electrode are electrically connected together stably and firmly by the bridges, the connection strength between the bridges and the electrode sections is powerful, to avoid the dropping off problem of the bridges at the connecting points.

BRIEF DESCRIPTION OF THE DRAWINGS

The above objects and advantages of the present application will become more readily apparent to those ordinarily skilled in the art after reviewing the following detailed description and accompanying drawings, in which.

DETAILED DESCRIPTION OF PREFERRED EMBODIMENTS

Figure 1:
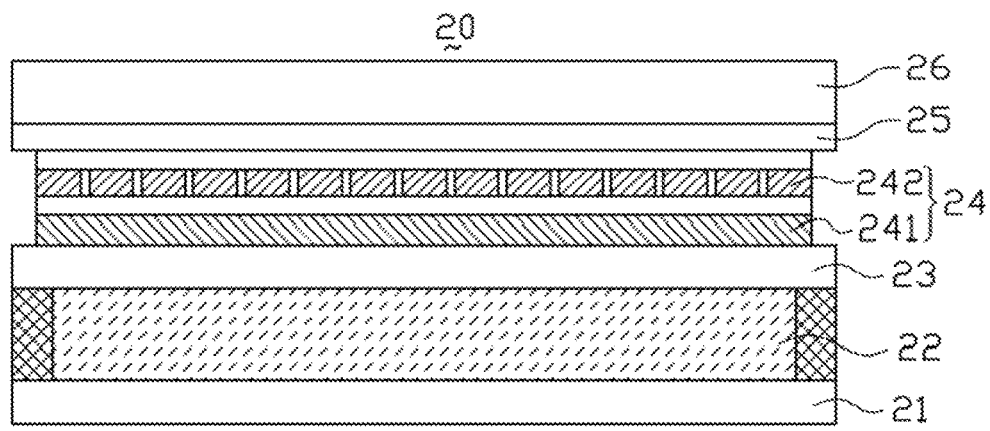
FIG. 1 is a cross-sectional view of a conventional touch display panel.
Figure 2:
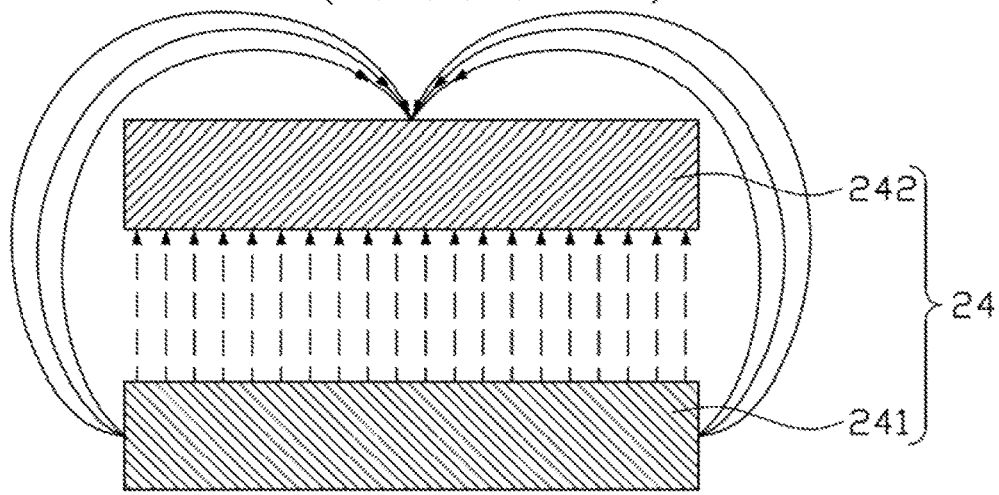
FIG. 2 is a schematic view of an electric field distribution of the touch sensor in the conventional touch display panel of FIG. 1.
Figure 3:
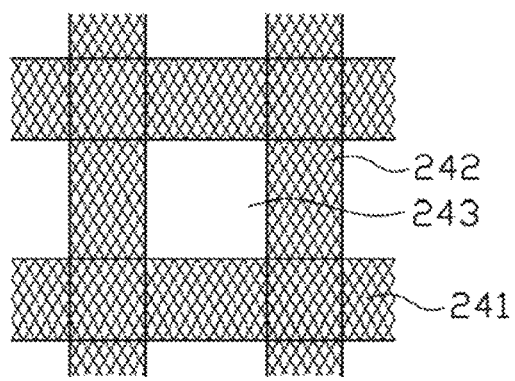
FIG. 3 is a planar schematic view of the touch sensor in the conventional touch display panel of FIG. 1.

The present application will now be described more specifically with reference to the following embodiments. It is to be noted that the following descriptions of preferred embodiments of this application are presented herein for purpose of illustration and description only. It is not intended to be exhaustive or to be limited to the precise form disclosed.

The orientation words "top" and "bottom" in the specification are only used to express relative direction relationship. In the drawings of the present application, the top of the touch display pane 110 is near the user, and its bottom is located away from the user.

Figure 4:
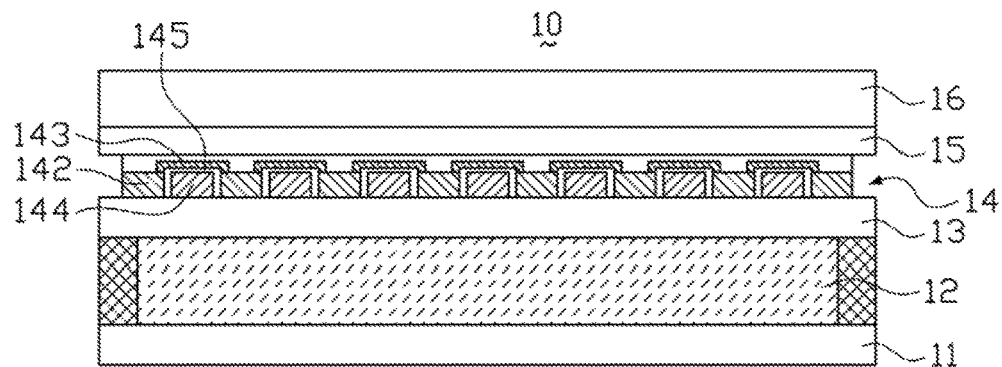
FIG. 4 is a cross-sectional view of a touch display panel according to an embodiment of the present application.

FIG. 4 is a cross-sectional view of a touch display panel according to an embodiment of the present application. Referring to FIG. 4, the touch display panel 10 includes, from the bottom to the top, a thin-film transistor (TFT) substrate 11, a liquid crystal layer 12, a color filter (CF) substrate 13, a touch sensor 14, a polarizer 15, and a cover lens 16. Particularly, the CF substrate 13 is disposed above the TFT substrate 11, with the liquid crystal layer 12 being sandwiched between the CF substrate 13 and the TFT substrate 11. The polarizer 15 is disposed above the CF substrate 13, with the touch sensor 14 being sandwiched between the CF substrate 13 and the polarizer 15. The cover lens 16 is disposed on the polarizer 15. It is noted that extra layer(s) may be provided and sandwiched between any two adjacent layers of the touch display panel in accordance with different practical or functional requirements.

Specifically, a pair of electrodes are provided on the TFT substrate 11, the pair of electrodes include a pixel electrode and a common electrode. A horizontal electric field is generated between the pixel electrode and the common electrode to control the rotation of the liquid crystals in the liquid crystal layer 12. The CF substrate 13 is a transparent substrate, which is made of glass, polymer plastic materials such as polycarbonate (PC), polyvinylchloride (PVC) or other transparent materials. The touch sensor 14 is provided and arranged on the CF substrate 13, for example, the touch sensor 14 may be directly formed on an outer surface of the CF substrate 13. Then, the polarizer 15 and the cover lens 16 are disposed on the touch sensor 14, wherein the touch sensor 14 is sandwiched between the CF substrate 13 and the polarizer 15, and the cover lens 16 is disposed on the polarizer 15. The polarizer 15 can be made of polyvinyl alcohol (PVA) or other materials, and the cover lens 16 can be made of transparent glass or other transparent materials.

Referring to FIGS. 4 to 12, the touch sensor 14 includes a plurality of first electrodes 142, a plurality of second electrodes 144, a plurality of third electrodes 146, a plurality of bridges 143, and an insulating layer 145.

The first electrodes 142, the second electrodes 144 and the third electrodes 146 are located at the same layer. Therefore, a horizontal electric field is generated between the first electrodes 142 and the second electrodes 144 (FIG. 6), instead of a vertical electric field generated between these electrodes in the conventional touch display panel. The first electrodes 142 and the second electrodes 144 are electrically insulated from each other, for the insulation purpose, an insulation layer (not shown) may be disposed between them, or they are spaced from each other, but it is not limited thereto. One of the first electrode 142 and the second electrode 144 is a receiving electrode (Rx), and the other one of the first electrode 142 and the second electrode 144 is an emission electrode (Tx). For example, the first electrode 142 is a receiving electrode (Rx), and the second electrode 144 is an emission electrode (Tx); or alternatively, the first electrode 142 is an emission electrode (Tx), and the second electrode 144 is a receiving electrode (Rx).

Figure 5:
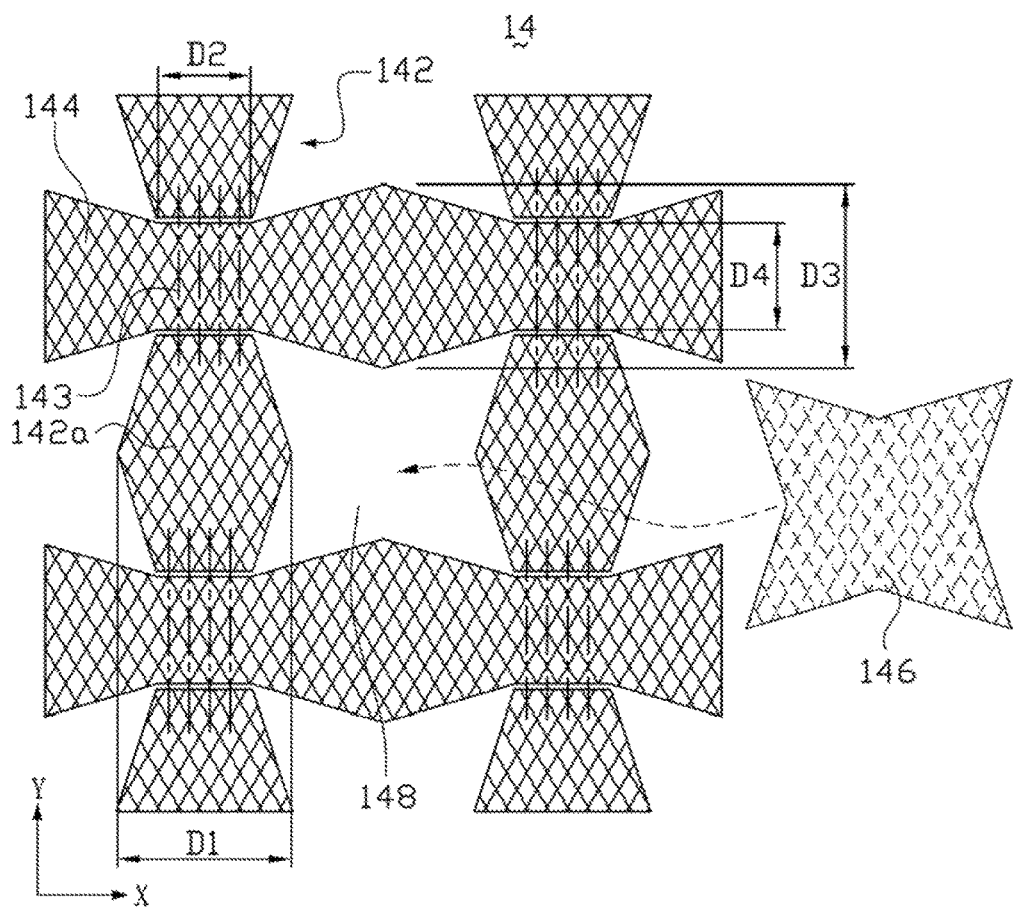
FIG. 5 is a planar schematic view of the touch sensor in the touch display panel of FIG. 4.
Figure 6:
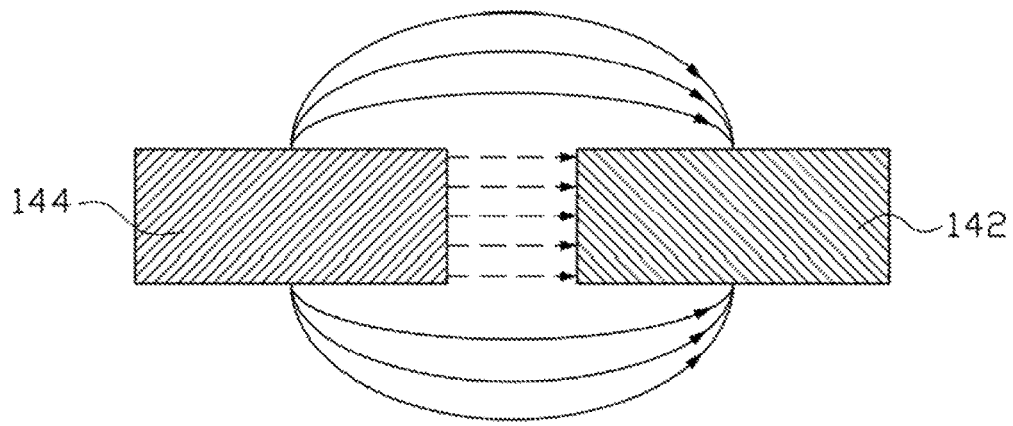
FIG. 6 is a schematic view of an electric field distribution of the touch sensor in the touch display panel of FIG. 4.

The first electrodes 142 are parallel to and spaced from each other. The second electrodes 144 are parallel to and spaced from each other. The first electrodes 142 are intersected with the second electrodes 144. Particularly, an extension direction of the first electrode 142 is perpendicular to that of the second electrode 144. In this embodiment, the second electrodes 144 extend along the X-axis direction, and the first electrodes 142 extend along the Y-axis direction. As described above, the first electrodes 142 and the second electrodes 144 are formed at the same layer. In the embodiment, each of the second electrodes 144 is a continuous strip electrode without being uninterrupted, each of the first electrodes 142 is a discontinuous strip electrode and interrupted by the second electrodes 144. That is, each of the first electrodes 142 is interrupted by the second electrodes 144 to form a plurality of electrode sections 142a, each electrode section 142a is located between two adjacent second electrodes 144, and two adjacent electrode sections 142a is interrupted by a second electrode 144. Each of the bridges 143 is located between two adjacent electrode sections 142a of the first electrode 142, and the two adjacent electrode sections 142a are electrically connected together via a bridge 143. As shown in FIG. 5, the insulating layer 145 is provided and arranged between the second electrode 144 and the bridge 143 to insulate the bridge 143 from the second electrode 144.

Because the first electrodes 142 and the second electrodes 144 are formed at the same layer, when light transmits through the first electrodes 142 and the second electrodes 144, there is only a single-layer interference phenomenon occurred in the embodiment. However, in the conventional touch display panel, the emission electrode and the receiving electrode are formed and arranged at two different layers, an interference phenomenon will occur separately in each of the two different layers to result in a double-layer interference phenomenon. As a result, in the embodiment, the interference phenomenon is obviously reduced, and the display effect of the touch display panel is accordingly improved.

Figure 8:
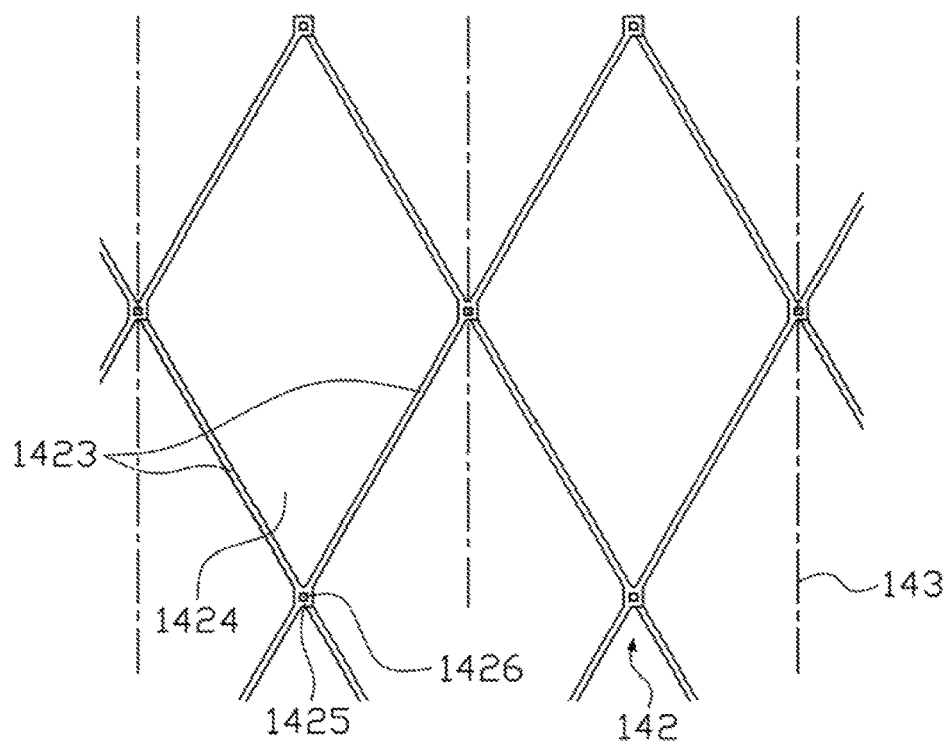
FIG. 8 is a partially enlarged view of FIG. 7.
Figure 10:
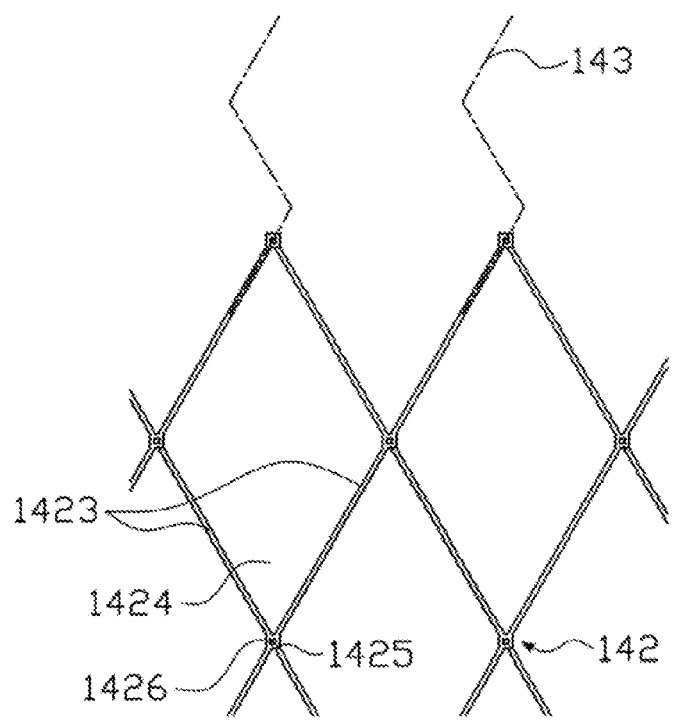
FIG. 10 is a partially enlarged view of FIG. 9.
Figure 12:
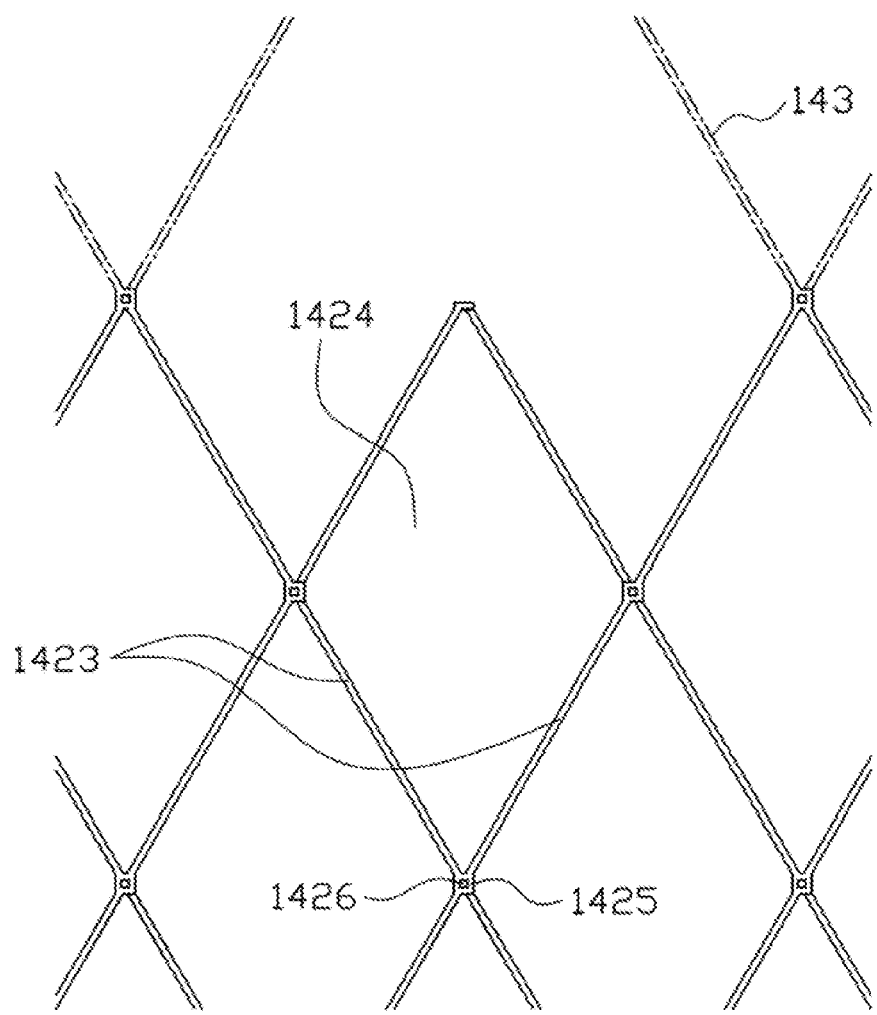
FIG. 12 is a partially enlarged view of FIG. 11.

Referring to FIGS. 8, 10 and 12, each of the first electrodes 142 is in the form of a mesh structure, and the mesh structure is formed by a plurality of conductive wires 1423 intersecting with each other to form a plurality of grids 1424. A plurality of nodes 1425 are formed at the intersection points of the conductive wires 1423. In other words, the grids 1424 are connected together by the nodes 1425. In the embodiment, the mesh structure is made of laminated metal materials including aluminum (Al) and molybdenum (Mo). The laminated metal materials can be Mo+Al or Mo+Al+ Mo, wherein Al is the main conductive material having the advantage of good conductivity and low cost, and Mo can protect Al from being oxidized and is easy to combine with glass substrate or insulating layers. In other embodiments, the mesh structure can also be made of transparent oxide (e.g., ITO), nano silver, or grapheme, etc. Each of the grids 1424 has a rhomboid shape having four sides and four corners, wherein the four sides of each grid 1424 are formed respectively by segments of four conductive wires 1423 which are intersected with each other, and the four corners of each grid 1424 are connected respectively with four corresponding nodes 1425. The node 1425 is in an annular shape with a central portion of the node 1425 being hollow to define a central hole 1426, wherein the annular shape may be circular shape, square shape, polygonal shape, etc.

Since the node 1425 is in an annular shape and the central portion of the annular node 1425 is hollow with the central hole 1426, light can transmit through the central hole 1426 of the nodes 1425. Further, a width of the annular node 1425 is the same as a width of the conductive wire 1423, and the surface resistance at the node 1425 is almost the same as the surface resistance of the conductive wire 1423. As compared with conventional solid nodes, the surface resistance at the annular nodes 1425 in the present embodiment is decreased, and signal attenuation is accordingly reduced when a signal is transmitted by the first electrode 142. In other words, the line width of the conductive wires 1423 for forming the mesh structure of the first electrode 142 may be reduced as compared with conventional electrode, and simultaneously, the light transmission of the first electrode 142 is improved. Experiments are carried out under the same conditions, for example, the grids of the first electrodes are in rhomboid shape, the interior acute angle of each grid is 58°, the shorter diagonal length is in the range between 100 μm and 1000 μm, a line width of the conductive wire is 4 μm, and the backlight brightness is 366.4 cd/m$^2$. It is proved that the touch display panel adopting a mesh structure with the annular nodes 1425 in the embodiment has a brightness of 340.5 cd/m$^2$ when displaying a white frame, while the conventional touch display panel adopting a mesh structure with solid nodes (i.e., without the central hole) has a brightness of 315.1 cd/m$^2$ when displaying a white frame. This shows that the mesh structure in the present embodiment has a better light transmission. Especially, when the line width of the conductive wire 1423 of the first electrode 142 is less than or equal to 4 μm, a better light transmission is achieved. When the line width of the conductive wire 1423 is reduced, the area surrounded by each grid 1424 is increased, and the size of the central hole 1426 of each node 1425 is also increased. For example, if the line width of the conductive wire 1423 is 4 um, and the size of the central hole 1426 of each node 1425 is 4 μm*4 μm; when the line width of the conductive wire 1423 decreases to 2.5 μm, the size of the central hole 1426 of each node 1425 will increase to 5.5 μm*5.5 μm. Since the size of the central hole 1426 of the node 1425 and the area surrounded by each grid 1424 are both increased due to the reduction of the line width of the conductive wire 1423, the total light transmission area increases. Therefore, the first electrodes 142 with smaller line width can have a better light transmission effect and the influence of Moire fringe is accordingly reduced.

Figure 7:
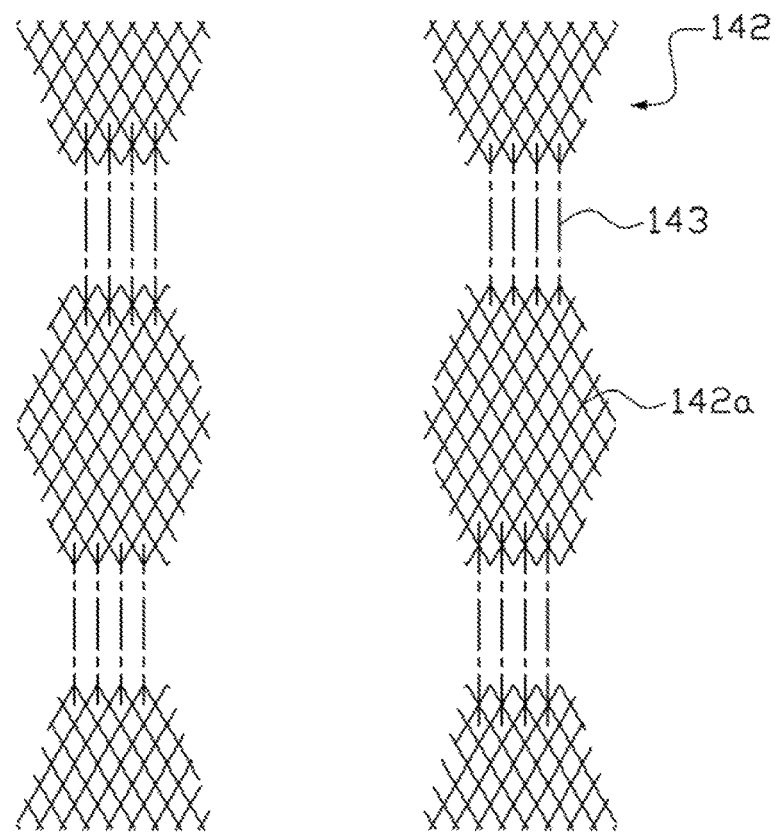
FIG. 7 is a schematic view of the bridges according to a first example in the embodiment of the present application.
Figure 9:
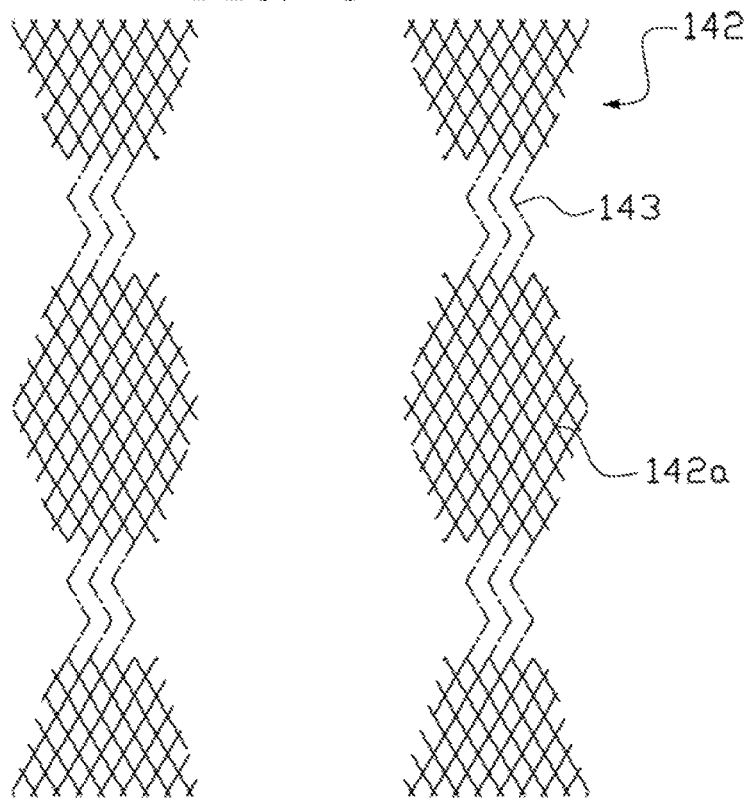
FIG. 9 is a schematic view of the bridges according to a second example in the embodiment of the present application.
Figure 11:
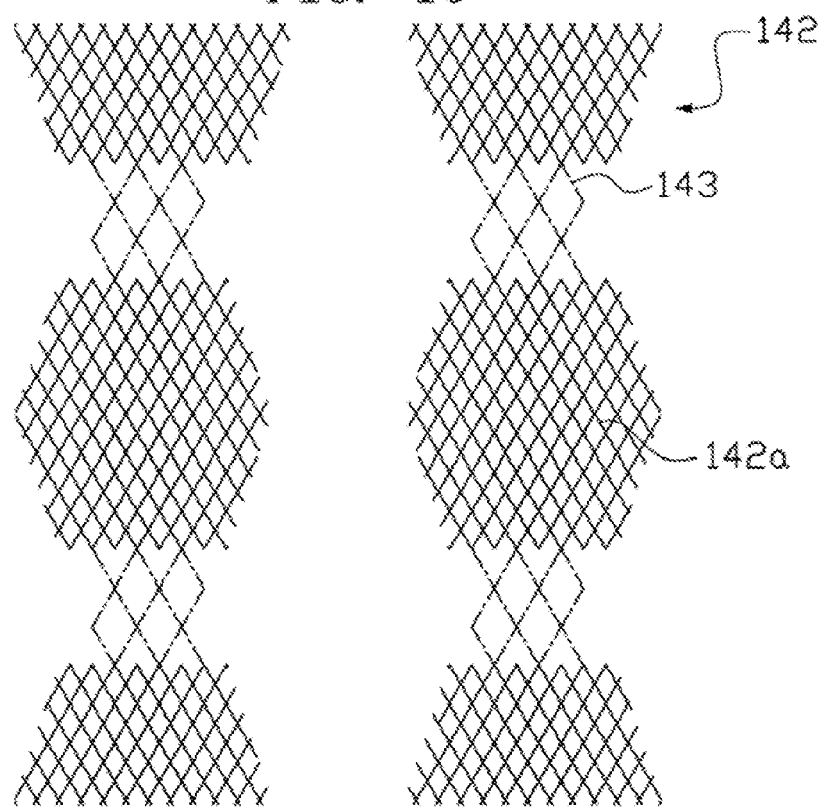
FIG. 11 is a schematic view of the bridges according to a third example in the embodiment of the present application.

Referring to FIGS. 7-12, the bridges 143 are used to electrically connect the spaced electrode sections 142a of the first electrode 142 together. The bridges 143 can be made of a conductive material in the form of straight lines, polylines, or a mesh structure. In a first example as shown in FIGS. 7-8, each bridge 143 is in the form of a plurality of straight lines. In a second example as shown in FIGS. 9-10, each bridge 143 is in the form of a plurality of polylines. In a third example as shown in FIGS. 11-12, each bridge 143 is in the form of a mesh structure. Two adjacent electrode sections 142a of the first electrode 142 are electrically connected together by a bridge 143. In detail, the bridge 143 electrically connects the nodes 1425 of the two electrode sections 142a together. One end of the bridge 143 is electrically connected with the nodes 1425 of one electrode section 142a, and the other end of the bridge 143 is electrically connected with the nodes 1425 of an adjacent electrode section 142a. The electrical connection between the bridge 143 and the nodes 1425 is realized by the two ends of the bridge 143 being inserted into and fixed in the central holes 1426 of the nodes 1425, such that two adjacent electrode sections 142a of the first electrode 142 are firmly and stably connected with each other by the bridge 143, to thereby improve the quality of the electrical connection.

As shown in FIG. 5, each of the second electrodes 144 is also in the form of a mesh structure, and the second electrodes 144 may have the same mesh structure as the first electrodes 142, except that each of the second electrodes 144 is a continuous strip electrode without being uninterrupted. Therefore, description about the detailed structure of the second electrodes 144 is omitted here for clarity. In the embodiment, a width of the first electrode 142 is varied along its extension direction (i.e., the Y-axis), the first electrode 142 has a maximal width D1 of 2 mm and a minimal width D2 of 1 mm; a width of the second electrode 144 is also varied along its extension direction (i.e., the X-axis), the second electrode 144 has a maximal width D3 of 2 mm and a minimal width D4 of 1 mm. Particularly, the narrow portion D2 of the first electrode 142 is interrupted and crossed by the narrow portion D4 of the second electrode 144, and the bridge 143 extends across the narrow portion D4 of the second electrode 144, so as to two adjacent electrode sections 142a of the first electrode 142 are electrically connected with each other by the bridge 143.

As shown in FIG. 5, a plurality of blank areas 148 are defined and surrounded by the first electrodes 142 and the second electrodes 144. Each of the blank areas 148 is defined by two first electrodes 142 intersecting with two second electrodes 144. The blank areas 148 are not covered by the first electrodes 142 and the second electrodes 144. The third electrodes 146 are disposed respectively within the blank areas 148. The third electrodes 146 may have the same mesh structure as the second electrodes 144. Preferably, the third electrode 146 has the same profile as the blank area 148, such that the third electrode 146 can exactly fill the blank area 148. However, the third electrode 146 should be electrically insulated from the first electrodes 142 and the second electrodes 144. That is, there are gaps or an insulating material between the third electrode 146 and the first electrodes 142 or the second electrodes 144. After the blank areas 148 are filled with the third electrodes 146, the pattern of the touch sensor 14 becomes uniform throughout the whole touch display panel 10, such that the light transmission through the touch sensor 14 is uniform to bring a uniform appearance to the user.

In the embodiment, the first electrodes 142, the second electrodes 144 and the third electrodes 146 are mesh structure in a single metal layer, and the bridges 143 electrically connect the spaced electrode sections 142a of the first electrode 142. On one hand, the material waste is avoided if the first electrodes 142 and the second electrodes 144 are formed at different layers; on the other hand, the electrode sections 142a of the first electrodes 142 are stably and firmly connected with each other by the bridges 143, the connection strength between the bridges 143 and the electrode sections 142a of the first electrodes 142 is powerful, to avoid the dropping off problem of the bridges 143 at the connecting points.

Figure 13:
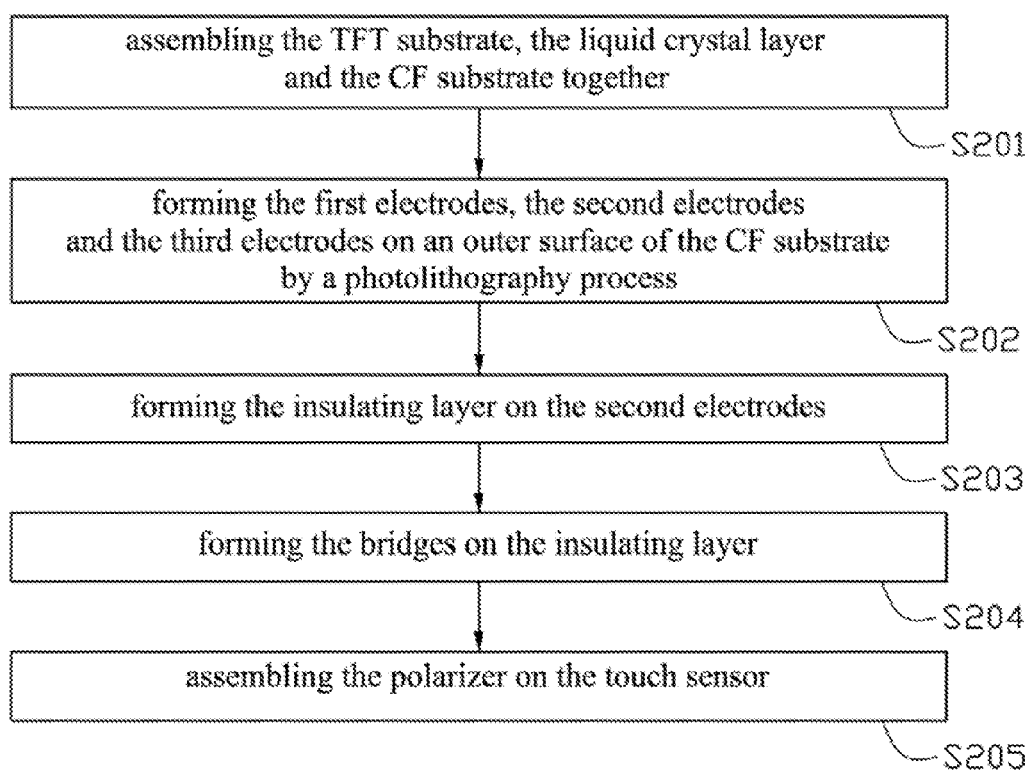
FIG. 13 is a flow chart of a method for manufacturing the touch display panel in the embodiment of the present application.

FIG. 13 is a flow chart of a method for manufacturing the touch display panel of the present embodiment. Referring to FIG. 13, the method of manufacturing the touch display panel 10 includes the following steps:

S201: assembling the TFT substrate 11, the liquid crystal layer 12 and the CF substrate 13 together to form a display panel, wherein the liquid crystal layer 12 is sandwiched between the TFT substrate 11 and the CF substrate 13;

S202: forming the first electrodes 142, the second electrodes 144 and the third electrodes 146 on an outer surface of the CF substrate 13 by a photolithography process, wherein the first electrodes 142, the second electrodes 144 and the third electrodes 146 are located at the same layer and are electrically insulated from each other;

S203: forming the insulating layer 145 on the second electrodes 144;

S204: forming the bridges 143 on the insulating layer 145, wherein two adjacent electrode sections 142a of the first electrode 142 are electrically connected with each other by a bridge 143, and the first electrodes 142, the second electrodes 144, the third electrodes 146 and the bridges 143 together form the touch sensor 14;

S205: assembling the polarizer 15 and the cover lens 16 on the touch sensor 14, wherein the touch sensor 14 is sandwiched between the CF substrate 13 and the polarizer 15, and the cover lens 16 is disposed on the polarizer 15.

The photolithography process typically includes the steps of depositing a metal layer, coating a photoresist layer on the metal layer, taking exposure to the photoresist layer, etching the metal layer after exposure, removing the photoresist layer after etching, etc.

The above illustrated embodiments have the following advantages. In the touch display panel 10, the first electrodes 142 and the second electrodes 144 of the touch sensor 14 are formed at the same layer. As light passes through the touch sensor 14, the light interface phenomenon is weakened, to improve the display effect of the touch display panel 10. Further, the blank areas 148 in the touch sensor 14 are filled with the third electrodes 146, such that the pattern of the touch sensor 14 becomes uniform throughout the touch display panel 10, and the light transmission through the touch sensor 14 is uniform to bring a uniform appearance to the user. Moreover, the electrode sections 142a of each first electrode 142 are electrically connected together stably and firmly by the bridges 143, the connection strength between the bridges 143 and the electrode sections 142a is powerful, to avoid the dropping off problem of the bridges 143 at the connecting points.

While the application has been described in terms of what is presently considered to be the most practical and preferred embodiments, it is to be understood that the application needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A touch display panel, comprising:
   a thin-film transistor (TFT) substrate;
   a color filter (CF) substrate disposed above the TFT substrate;

a liquid crystal layer sandwiched between the TFT substrate and the CF substrate;

a polarizer disposed above the CF substrate; and a touch sensor provided between the CF substrate and the polarizer, wherein the touch sensor comprises a plurality of first electrodes, a plurality of second electrodes, a plurality of bridges and an insulating layer, the first electrodes and the second electrodes are located at the same layer, the first electrodes are intersected with the second electrodes, each of the second electrodes is continuous without being interrupted, each of the first electrodes is interrupted by the second electrodes to form a plurality of electrode sections, two adjacent electrode sections of each of the first electrodes are electrically connected via a bridge, each of the first electrodes is in the form of a mesh structure formed by, a plurality of conductive wires intersecting with each other, each of the first electrodes comprises a plurality of nodes formed at intersection points of the conductive wires, each node is in an annular shape with a central portion of the node being removed and hollow to define a central hole within the conductive wires of the first electrodes, the bridge electrically connects nodes of one electrode section of the first electrodes with nodes of another adjacent electrode section of the first electrodes, and two ends of the bridge are inserted into and fixed in the central holes of the nodes of the one electrode section and the central holes of the nodes of the another adjacent electrode section, respectively, the insulating layer is arranged between the second electrodes and the bridges to insulate the bridges from the second electrodes;

wherein the conductive wires intersect with each other to form a plurality of first grids, the first grids are connected together by the nodes, each of the first grids has a first rhomboid shape having four sides and four corners, the four sides of each first grid are formed respectively by segments of four conductive wires which are intersected with each other, and the four corners of each first grid are connected respectively with four corresponding nodes;

the bridge comprises a plurality of conductive lines to form a mesh structure comprising a plurality of second grids, each of the second grids has a second rhomboid shape without any of the plurality of the conductive lines inside it; and the first rhomboid shape is smaller than the second rhomboid shape and an interior acute angle of the first rhomboid shape is same as an interior acute angle of the second rhomboid shape.

2. The touch display panel of claim 1, wherein the touch sensor comprises a plurality of third electrodes, a plurality of blank areas are defined and surrounded by the first electrodes and the second electrodes, the third electrodes have the same quantity as the blank areas and the third electrodes are respectively disposed within the blank areas in one-to-one correspondence.

3. The touch display panel of claim 2, wherein each of the second electrodes and each of the third electrodes are in the form of a mesh structure.

4. The touch display panel of claim 2, wherein the third electrode has the same profile as the blank area, the third electrode exactly fills the blank area, and the first electrodes, the second electrodes and the third electrodes are electrically insulated from each other.

5. The touch display panel of claim 2, wherein the third electrode has the same mesh structure as the first electrode, the node with the central hole is formed at the intersection point of every two conductive wires of each third electrode that are intersected with each other, such that the nodes with the central hole are distributed throughout the third electrodes.

6. The touch display panel of claim 1, wherein the node with the central hole is formed at the intersection point of every two conductive wires of each first electrode that are intersected with each other, such that the nodes with the central hole are distributed throughout the first electrodes.

7. The touch display panel of claim 1, wherein the second electrode has the same mesh structure as the first electrode, the node with the central hole is formed at the intersection point of every two conductive wires of each second electrode that are intersected with each other, such that the nodes with the central hole are distributed throughout the second electrodes.

8. The touch display panel of claim 1, wherein a line width of the node is the same as a line width of the conductive wire.

9. The touch display panel of claim 8, wherein the line width of the conductive wire is less than or equal to 4 μm.

* * * * *